US008510542B2

(12) United States Patent
Srinivasan et al.

(10) Patent No.: US 8,510,542 B2
(45) Date of Patent: Aug. 13, 2013

(54) FLASH MEMORY DEVICE HAVING MEMORY PARTITIONS AND INCLUDING AN EMBEDDED GENERAL PURPOSE OPERATING SYSTEM FOR BOOTING A COMPUTING DEVICE

(75) Inventors: Kattiganehalli Y. Srinivasan, Princeton Junction, NJ (US); Ranjan K. Gupta, Salt Lake City, UT (US); Clyde R. Griffin, Mapleton, UT (US)

(73) Assignee: Oracle International Corporation, Redwood Shores, CA (US)

( * ) Notice: Subject to any disclaimer, the term of this patent is extended or adjusted under 35 U.S.C. 154(b) by 877 days.

(21) Appl. No.: 12/286,561

(22) Filed: Oct. 1, 2008

(65) Prior Publication Data

US 2010/0082962 A1    Apr. 1, 2010

(51) Int. Cl.
*G06F 15/177* (2006.01)

(52) U.S. Cl.
USPC .................................. 713/2; 714/15

(58) Field of Classification Search
USPC ................................ 713/2; 714/15
See application file for complete search history.

(56) References Cited

U.S. PATENT DOCUMENTS

| 4,959,774 | A * | 9/1990 | Davis .............................. 714/6.1 |
| 6,986,030 | B2 * | 1/2006 | Shmueli et al. .................... 713/1 |
| 7,383,386 | B1 * | 6/2008 | Iyer et al. ...................... 711/115 |
| 7,613,891 | B2 * | 11/2009 | Rudelic .......................... 711/163 |
| 7,627,464 | B2 * | 12/2009 | Hollingsworth et al. ........ 703/24 |
| 7,664,984 | B2 * | 2/2010 | Wang et al. ...................... 714/15 |
| 7,725,701 | B2 * | 5/2010 | Rios et al. .......................... 713/1 |
| 2002/0166059 | A1 * | 11/2002 | Rickey et al. ................. 713/200 |
| 2004/0015709 | A1 * | 1/2004 | Chen et al. ..................... 713/193 |
| 2007/0157013 | A1 * | 7/2007 | Park ................................... 713/1 |
| 2007/0209035 | A1 | 9/2007 | Sonderegger et al. |
| 2008/0052507 | A1 * | 2/2008 | Chow et al. ....................... 713/2 |
| 2008/0098163 | A1 | 4/2008 | Lin |
| 2008/0147964 | A1 | 6/2008 | Chow et al. |
| 2008/0195900 | A1 | 8/2008 | Chang et al. |
| 2008/0209116 | A1 | 8/2008 | Caulkins |
| 2008/0229005 | A1 * | 9/2008 | Iyer et al. ...................... 711/103 |
| 2009/0094447 | A1 * | 4/2009 | Yang et al. ....................... 713/2 |
| 2010/0287363 | A1 * | 11/2010 | Thorsen ........................... 713/2 |

OTHER PUBLICATIONS

"System Boot Sequence;" Apr. 17, 2001; The PC Guide; http://www.pcguide.com/ref/mbsys/bios/bootSequence-c.html; 3 pages.

(Continued)

*Primary Examiner* — Chun Cao
(74) *Attorney, Agent, or Firm* — Osha Liang LLP

(57) ABSTRACT

Methods and apparatus involve booting a computing device from a flash device. The flash device has memory partitions, including a read-only and a read/write partition. The read-only includes an operating system for use by the computing device and defines an initial system state. The read/write is configured to store a delta from the initial system state. Upon booting the computing device subsequent to an initial boot, the delta and the initial system state together define the whole system state. In other features, a write engine from the read-only partition tracks changes to the initial system state and writes some, but not all of the changes back to the read/write partition thereby minimizing a number of writes to the flash memory. In this manner, the speed of the flash memory can be used to quickly boot/reboot a computing device, while avoiding the wear limits associated with writing to flash devices.

4 Claims, 4 Drawing Sheets

(56) References Cited

OTHER PUBLICATIONS

"Computer Boot Sequence;" Jul. 28, 2003; http://mossywell.com/boot-sequence/ . . . , 40 pages.

"How Splashtop Works;" 2006-2008; Splashtop; http://wvvw.splashtop.com/how_splashtop_works.php; 1 page.

"FAQ;" 2006-2008; Splashtop;http:www.splashtop.com/faq.php; 2 pages.

"Intel Turbo Memory;" Aug. 13, 2008; Wikipedia; http:en.wikipedia.org/wiki/Intel_Turbo_Memory; 2 pages.

"Windows Vista I/O technologies;" Aug. 31, 2008; Wikipedia; http://en.wikipedia.org/wiki/ReadyDrive; 4 pages.

"Flash Memory;" Sep. 2, 2008; Wikipedia; http://en.wikipedia.org/wiki/Flash_memory; 16 pages.

"Booting;" Sep. 2, 2008; Wikipedia; http://en.wikipedia.org/wiki/Booting; 9 pages.

\* cited by examiner

US 8,510,542 B2

FLASH MEMORY DEVICE HAVING MEMORY PARTITIONS AND INCLUDING AN EMBEDDED GENERAL PURPOSE OPERATING SYSTEM FOR BOOTING A COMPUTING DEVICE

REFERENCE TO COMPUTER PROGRAM LISTING ON COMPACT DISC

This Application incorporates by reference the file entitled, "Computer Program Listing Appendix", created on May 1, 2013, and having size 11.0 bytes submitted on a separate compact disc. The aforementioned file includes example computer code. The aforementioned file is hereby incorporated by reference into the Detailed Description of the Illustrated Embodiments portion of the application.

FIELD OF THE INVENTION

Generally, the present invention relates to computing devices and computing environments involving flash memory. Particularly, although not exclusively, it relates to (re)booting from the flash memory and to avoiding reaching wear limits associated with writing to flash devices.

BACKGROUND OF THE INVENTION

Flash memory is becoming more popular as a persistent store for a range of hardware devices, including server-class hardware. As is known, flash memory provides a significant amount of non-volatile, solid-state storage, and has exceptionally durable packaging. It comes in a variety of devices, such as memory cards, mobile phones, USB thumb drives, PDAs, cameras, or the like. Also, it typifies one of two cell architectures, NOR flash or NAND flash, and each has limitations and advantages relative to the other regarding read, write and erase times, storage density, costs per storage bit, access (e.g., random or page), execute-in-place, etc.

In either form, flash memory has been fairly suggested as an alternative to platter-based hard drive memories. While flash memory would be expected to outperform hard drives in terms of speed, noise, power consumption, and a lack of mechanical movement avoiding breakage, its cost per gigabyte and memory wear is of such great concern that its present form is largely unavailable for complete hard drive replacement. Namely, modern costs regularly make flash memory significantly higher for the same amount of capacity and conventional erase/write cycle limitations, in both the total number of writes that a flash memory can support over a lifetime as well as the available number of writes per a given interval of time, prove unsatisfactory in comparison to the near endless write cycles of its hard drive counterparts. While most flash devices support some notion of "wear leveling," e.g., the ability of a flash device to enhance its life by remapping memory blocks to spread write operations between many memory sectors, for example, it still remains that typical flash devices only guarantee about 100,000 write-erase cycles, which is insufficient to support complex or monolithic systems, such as operating systems, file systems, etc. It is certainly insufficient when compounded in a virtualized environment where many virtual computing devices are guested on a single host platform, including each with its own operating system, drivers, interfaces, applications, etc.

Accordingly, a need exists in the art of flash memory for fully realizing its attendant advantages, such as speed, while simultaneously avoiding stressing the memory's endurance or reaching the wear limits associated with erases/writes. The need further contemplates achieving the foregoing in a flash device while enabling support for complex and monolithic systems otherwise unavailable in conventional flash devices. Naturally, any improvements along such lines should further contemplate good engineering practices, such as ease of implementation, unobtrusiveness, stability, etc.

SUMMARY OF THE INVENTION

The foregoing and other problems become solved by applying the principles and teachings associated with the hereinafter-described flash memory device for booting a computing device, including a general purpose operating system. At a high level, a virtualization engine is designed for embedding on flash devices. One key differentiation, however, is the management of flash writes in a manner transparent to the operating system stack while keeping within the "write constraints" imposed by the flash device. Among other ways, the foregoing is carried out by: (a) executing from a RAM based file system of an attendant computing device (the contents are selectively transferred from the flash device to the RAM); and (b) files that are modified from an initial or virgin state are identified and written back to the flash device at a rate that both simultaneously optimizes the robustness of the system while operating within the imposed write constraints of the flash device. In this manner, unmodified, general purpose operating systems designed for unlimited write cycles on persistent storage are supported with devices that are flash memory based which do have write cycle limitations; operation occurs within a "write constrained" environment while not compromising the robustness of the system; and system robustness can be traded for "wearing down" the flash memory, if necessary.

In various embodiments, methods and apparatus involve booting a computing device from an internal or external flash device. The flash device has a memory with a plurality of partitions, including a read-only and a read/write partition. The read-only partition includes an operating system for use by the computing device and defines an initial system state. The read/write partition is configured to store a delta from the initial system state. Upon booting the computing device subsequent to an initial boot, the delta and the initial system state together define the whole system state of the computing device.

In other embodiments, a write engine from the read-only partition tracks changes to the initial system state and writes some, but not all of the changes back to the read/write partition thereby minimizing a number of writes per a given time frame and a total number of writes to the flash memory. In this manner, the speed of the flash memory can be used to quickly boot/reboot a computing device, while avoiding stressing the memory-endurance or reaching the wear limits associated with writing to flash devices.

In still other embodiments, the read-only partition includes a boot loader that, early-on, invokes copying to a RAM of the computing device at least some or all the contents of the read-only partition. In this manner, the flash memory initially contains the contents needing to fully operate the computing device, but self-effectuates off-loading to the computing device from the flash device so the computing device can run itself, as is typical. Thereafter, the computing device (by way of the write engine), not the flash memory, undertakes analyzing and tracking changes to the initial system state to archive images, and upon occasion, saves them back to the flash memory to later reconstruct the whole system state as necessary. In certain embodiments, the functionality of the write engine monolithically undertakes the tracking of changes, archiving images, determining whether the occasion has arrived for saving back to the flash memory, etc.

A third partition in the flash memory is also contemplated and it typically consists of last-known-good or rollback image(s) for the computing device. Over time, the initial system state and the delta develop many earlier known-good images and the third partition houses one or all of them for recovery or other purposes.

Executable instructions loaded on one or more computing devices for undertaking the foregoing are also contemplated as are computer program products available as a download or on a computer readable medium. The computer program products are also available for installation on a network appliance or individual computing devices.

These and other embodiments of the present invention will be set forth in the description which follows, and in part will become apparent to those of ordinary skill in the art by reference to the following description of the invention and referenced drawings or by practice of the invention. The claims, however, indicate the particularities of the invention.

BRIEF DESCRIPTION OF THE DRAWINGS

The accompanying drawings incorporated in and forming a part of the specification, illustrate several aspects of the present invention, and together with the description serve to explain the principles of the invention. In the drawings.

DETAILED DESCRIPTION OF THE ILLUSTRATED EMBODIMENTS

In the following detailed description of the illustrated embodiments, reference is made to the accompanying drawings that form a part hereof, and in which is shown by way of illustration, specific embodiments in which the invention may be practiced. These embodiments are described in sufficient detail to enable those skilled in the art to practice the invention and like numerals represent like details in the various figures. Also, it is to be understood that other embodiments may be utilized and that process, mechanical, electrical, arrangement, software and/or other changes may be made without departing from the scope of the present invention. In accordance with the present invention, methods and apparatus are hereinafter described for a flash memory device for booting a computing device, including a general purpose operating system.

Figure 1:
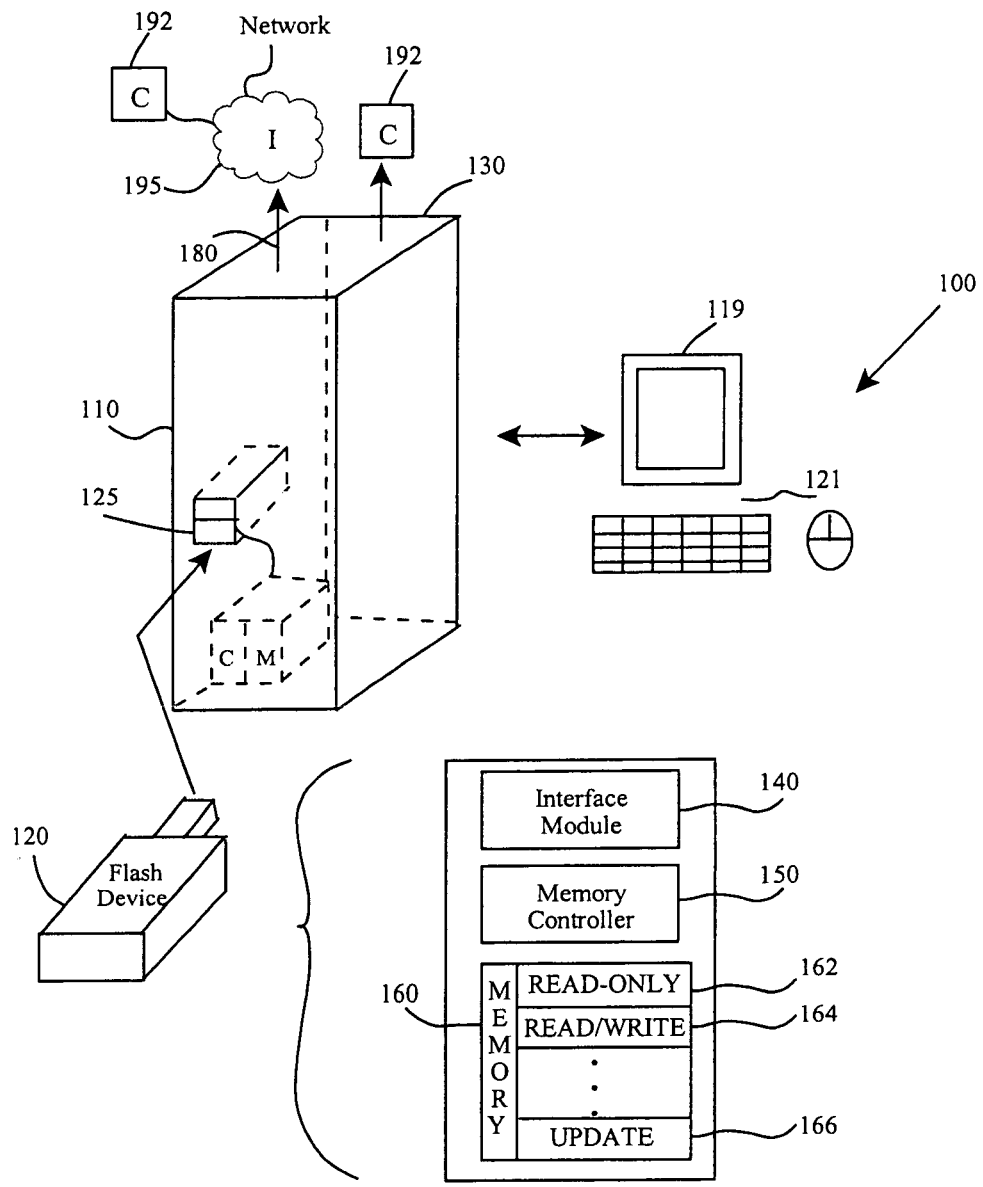
FIG. 1 is a diagrammatic view in accordance with the present invention of a representative computing environment for a flash memory to boot a computing device, including a general purpose operating system.

With reference to FIG. 1, a representative computing system environment 100 includes a computing device 110 and a flash device 120. The computing device includes a port 125 for receipt of a housing of the flash device or, alternatively, the flash device is pre-configured as part and parcel with the controller C and memory M of the computing device within its housing 130, such as on a motherboard. In the event the flash device embodies its own structure external to the computing device, the flash device comes in a variety of packages, such as a memory card, mobile phone, USB thumb drive (shown), PDA, camera, or the like. In any embodiment, the flash device generally typifies one of two memory-cell architectures, NOR flash or NAND flash, and skilled artisans understand the terms.

Further, the flash device 120 includes an interface module 140, a memory controller 150 and a flash memory-cell architecture 160, among other things. In more detail, the interface module is that which enables communication between the computing device, especially its controller and memory, and the memory of the flash device. In certain instances, the module contains a bus structure and command set logic for reading and writing the memory 160. Alternatively, the logic is separated into the separate functional block, the memory controller 150. In either instance, the memory controller further includes logic, circuitry, etc., to perform basic tasks such as allocating the blocks, bytes, etc. in the memory 160, prioritizing process instructions, mapping memory pointers, controlling read/write requests, or other similar administrative tasks. The memory 160 is where the actual memory cells are found, e.g., transistors (MOSFETs, NMOS, etc.) that store the values (i.e., binary, trinary, etc.) or data content of the memory. Also, the memory is partitioned into at least three memory partitions 162, 164, 166 that will be useful in quickly and successfully booting and re-booting the computing device 130, including booting of a full and monolithic operating system to be used by the computing device, while simultaneously avoiding the memory wear limits of the flash device.

Before then, however, the computing device 130 can typify the form of a general or special purpose computer, and can even represent a server-class of hardware. In the former, the computing device is any device that has need for installing and using an operating system. It can be a conventional fixed or mobile computer having an attendant monitor 119 and user interface 121. Alternatively, it can be a PDA, phone, camera, scanner, game console, hand-held device, game pad, satellite dish, printer or other peripheral device, or the like. In the latter, the server can be of a traditional type, such as a grid or blade server, and can fulfill roles, such as a hosting a web site(s), providing email, providing database or file services, etc. In either, the devices can also be virtual computing devices, such that no particular housing defines its computing functionality and portions thereof or multiple such devices, processors, controllers, etc., work together to establish said functionality. Of course, skilled artisans understand virtualization. Also, the computing devices can be stand-alone or networked. If networked, they are arranged to directly or indirectly communicate 180 with one or more other computing devices 192 or networks 195, and such may involve the Internet (I), an enterprise Intranet, etc., and skilled artisans readily understand the configuration.

Figure 2:
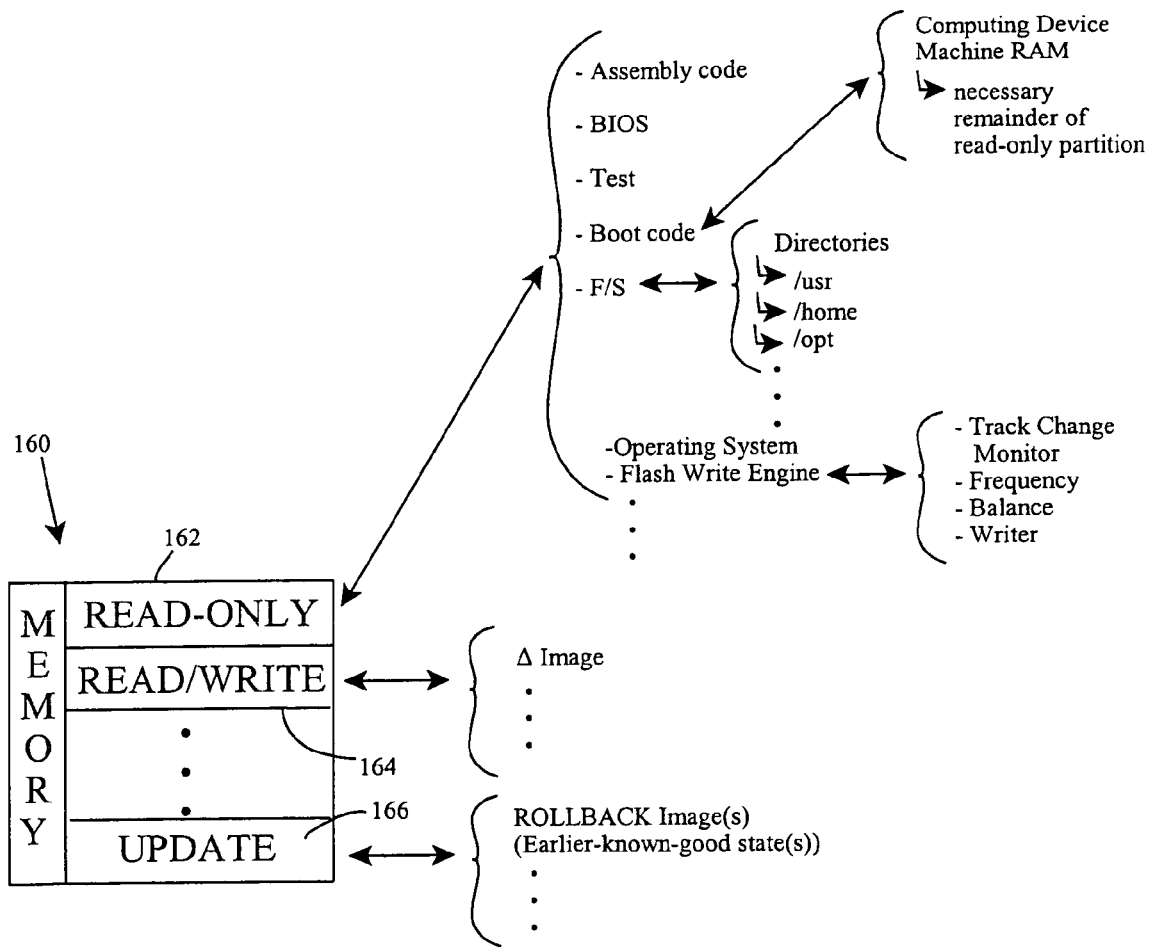
FIG. 2 is a diagrammatic view in accordance with the present invention of a more detailed version of the flash memory of FIG. 1.

Returning to the flash memory 160, FIG. 2 shows the partitions 162, 164 and 166 in more detail. In one embodiment, the first partition 162 is configured as a read-only partition, while the second partition 164 is configured as a writable partition, such as a read/write partition. The third partition, which can be also readable and writable is intended to support system updates. In other partitions (not shown), users could configure a memory space for future-use, for containing overruns of other partitions, or the like.

In content, the partitions store vastly different items, each for different purposes. In the read-only partition, its contents are used as the root device for booting and operating the attendant computing device 110 (FIG. 1), and its applications, and stores items such as the root file system, BIOS, Operating System, various system or memory Tests, boot loader and/or other items typically found in booting an operating system for a computer. It also includes a flash write engine, described more below. In the read/write partition, its contents include the accumulated system state of the computing device in its running state, which will be referred to as a delta (Δ). In the update partition, its contents are representatively configured to store one or more earlier-known-good system images for recovery or rollback to an earlier known good operating time. As will be seen, each contributes to the overall process during use.

Figure 3:
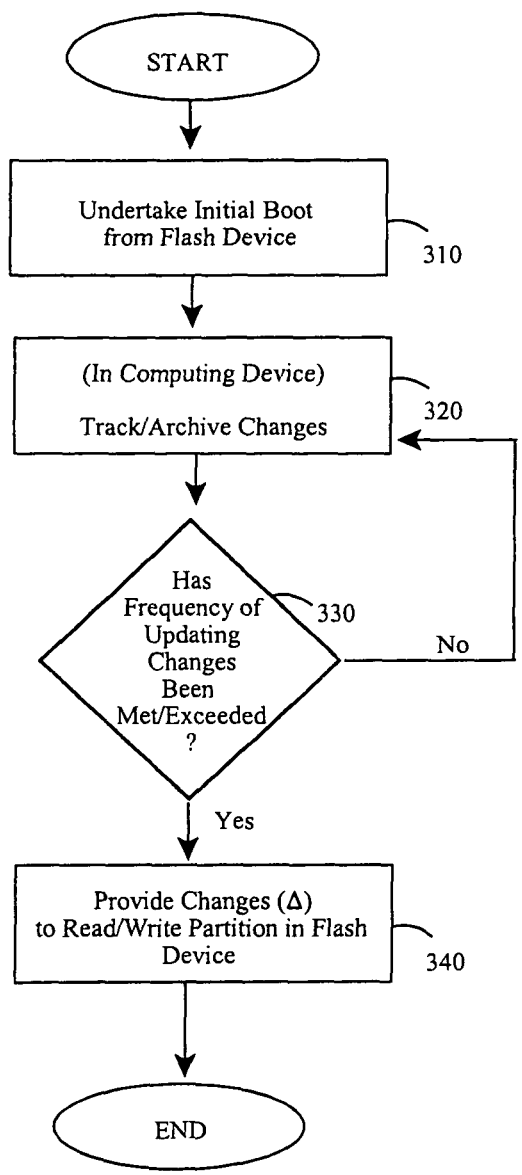
FIGS. 3 and 4 are flow charts in accordance with the present invention.

With reference to FIG. 3, and continued reference to FIG. 2, booting 310 of the computing device begins with the contents of the flash memory 160. As before, this can occur after the appropriate interfacing of an external flash device with an attendant port of a separate computing device, or can be pulled straight from flash memory of a motherboard within the computing device itself. In either situation, initial booting begins. In one instance, this means the boot code in the read-only partition invokes the RAM of memory M (FIG. 1) of the computing device to copy out the contents of the read-only partition into the RAM so once the computing device boots, it will execute out of the RAM, not the flash memory. As part of this copying, the write engine of the read-only partition is transferred from the flash memory to the computing device as well as any other events necessary to populate system directories, such as /usr, /home, /opt etc. Then, upon completion of the boot, the computing device is operational in its virgin state, as with any computing device having undertaken its initial boot, and traditional local or networked computing activities are now available to users.

At step 320, it is to be appreciated that the computing activities of the user cause change to the virgin state. For example, data of a computing application is altered as the user undertakes word processing activities on the computing device. However, persisting these changes directly to the flash memory 160 would require writing to the flash memory and, over time, would quickly reach and exceed the erase-write cycle limitations of the flash memory. Thus, the changes that occur during the computing activities are tracked and archived relative to some point in time, such as the virgin state, and such occurs by way of the write engine (from the read-only partition, now resident in the computing device).

Then, upon the meeting of a predetermined frequency, e.g., at a given point in time, step 330, the tracked and archived changes are written back to the flash device, step 340. It is also written back to the read/write partition 164 of the flash memory since the archive will need to be later used to recreate the entirety of the system state. As should now be apparent, some, but not all of the tracked/archived changes are persisted back to the flash memory, thereby minimizing writes to the flash device. In turn, the erase-write cycle limits of the flash memory are never approached, much less exceeded, and the speed of the flash memory is taken advantage of to quickly boot/reboot a computing device, while avoiding stressing the memory-endurance associated with writing to flash devices. In other words, the flash write engine collects all files that have been modified since a specific point of reference (in time) and creates an archive, which captures or represents all the accumulated system state information that needs to be persisted. When the flash write engine is activated, but not for every possible time it could undertake a write activity, it writes this archive to the read/write partition on the flash device, thereby minimizing writes.

In a variety of ways, the flash write engine is activated based on a number of external events such as a) passage of time, b) when a critical file is modified whose persistence is critical to the robustness of the system, c) at power off, d) upon invocation of rebooting, e) periodically, f) randomly, or at other times. Naturally, the frequency with which the flash write engine is activated can be dynamically modulated to simultaneously optimize the robustness of the system while operating within the write constraints imposed by the flash device. Also, a preferred embodiment of the invention contemplates undertaking the tracking/archiving function, the determining whether the frequency has been met in order to actually perform a write, and the actual writing of changes back to the flash memory as part of the write engine seen in FIG. 2. In other embodiments, however, these events could be undertaken by other components or combinations of components.

Returning to the flow chart 300, if the frequency to undertaking writing to the flash device has not been met at step 330, changes are continued to be tracked by the system at step 320 until such time as the frequency becomes met. The process also repeats for as long as necessary until an archive eventually becomes persisted back on the flash memory. Also, as time progresses, many earlier images are known as good images to the system, and one or all can be saved in the update partition 166 of the flash memory for later recovery or other purposes.

Figure 4:
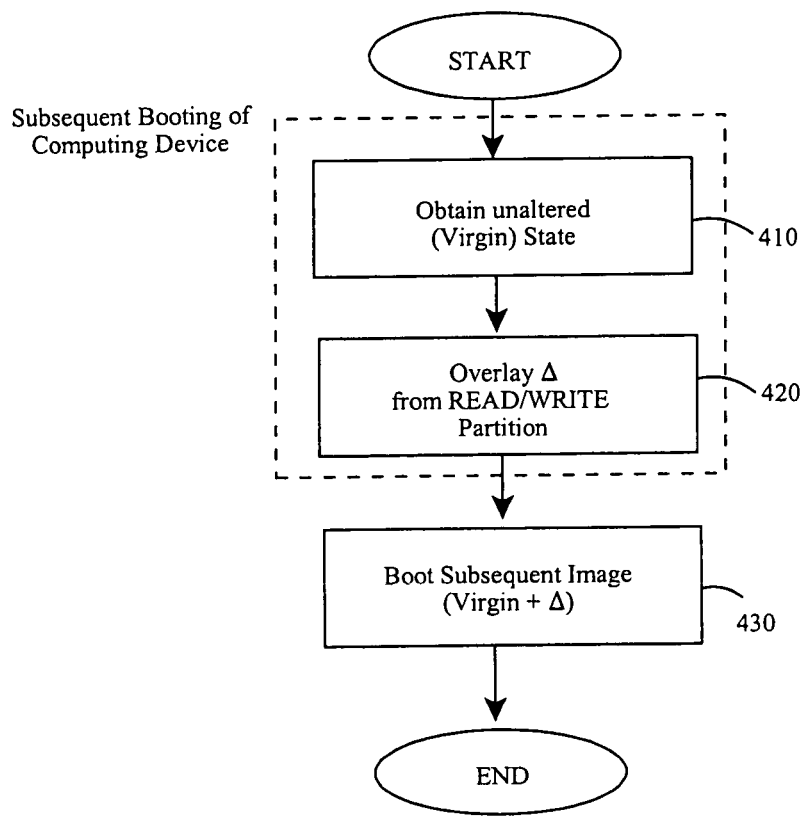

With reference to FIG. 4, during booting subsequent to an initial boot, the entire state of the system is recreated by obtaining the virgin state 410, maintained in the read-only partition, and overlaying the archive or delta state maintained in the read-write partition, 420. The subsequent image, e.g., the virgin state plus the delta state, is now the entire machine state which is booted at step 430. Alternatively, to the extent a catastrophic or other event causes corruption to the combined virgin state and the delta, or otherwise cannot be trusted as good, the contents of the update partition can be used to boot the system. In such instance, of course, anything will be lost from the time of the last-known-good image to the time of the catastrophe.

In any embodiment, skilled artisans will appreciate that enterprises or individuals can implement some or all of the foregoing with humans, such as system administrators, computing devices, executable code, or combinations thereof. In turn, methods and apparatus of the invention further contemplate computer executable instructions, e.g., code or software, as part of computer program products on readable media, e.g., disks, flash memory, CD's, etc., for insertion in a drive of computing device, or available as downloads or direct use from an upstream computing device. When described in the context of such computer program products, it is denoted that components thereof, such as modules, routines, programs, objects, data structures, etc., perform particular tasks or implement particular abstract data types within various structures of the computing system which cause a certain function or group of function, and such are well known in the art.

EXAMPLE

The following code contains early prototypes that successfully undertook some of the foregoing. At a high level, the methods consist of nvp_overlay_ramfs, nvp_monitor_filesystem and nvp_flush_ramfs. In general, the nvp_overlay_ramfs is that which is called during the boot-up phase and that which overlays the read/write partition. A script is executed which is generated by the nvp_monitor_filesystem method. The nvp_monitor_filesystem is also called during the bootup phase and is generally the method keeping track of all the files which were either deleted, created or moved. This information is also kept in a running script. The nvp_flush_ramfs is called during the shutdown phase, or could be called at any desired time. This method writes all the modified files (Δ) to the read/write partition. It also writes a script which is generated by the nvp_monitor_filesystem. The inventors, however, are not currently using the nvp_populate_ramfs method. But, at a high level, the nvp_populate_ramfs method was written to split the filesystem into read-only and read-write partitions. The read/write portion was based on the ramfs filesystem. In its present form, the image is already split into read/write and read-only portions so it is not necessary to be called. Instead, the idea is to call the nvp_flush_ramfs method whenever changes are needed to be saved. Also, the frequency to call this method is another algorithm (not shown) which is configurable and takes into consideration properties of the flash drive (yet to be coded).

Although the foregoing has been described in terms of specific embodiments, one of ordinary skill in the art will recognize that additional embodiments are possible without departing from the teachings of the present invention. This detailed description, therefore, and particularly the specific details of the exemplary embodiments disclosed, is given primarily for clarity of understanding, and no unnecessary limitations are to be implied, for modifications will become evident to those skilled in the art upon reading this disclosure and may be made without departing from the spirit or scope of the invention. Relatively apparent modifications, of course, include combining the various features of one or more figures with the features of one or more of other figures.

The invention claimed is:

1. A method of booting a computing device from a flash device, comprising:
   (a) configuring a first partition of a plurality of partitions in the flash device as a read-only partition, and a second partition of the plurality of partitions as a read/write partition, wherein the read-only partition comprises an initial system state and the read/write partition being configured to store deltas, wherein the initial system state comprises an operating system (OS);
   (b) during use, tracking changes from the initial system state to obtain tracked changes;
   (c) writing a first delta and a second delta, each correspond to at least one of the tracked changes, to the second partition, wherein the first delta is relative to the initial system state and the second delta is relative to the first delta;
   (d) writing the initial system state and the first delta to a third partition of the plurality of partitions after step (c); and
   (e) after (d):
      attempting to boot the computing device using the initial system state from the first partition and the first delta and the second delta from the second partition;
      making a determination that the attempt to boot failed;
      based on the determining, attempting to boot the computing device using the initial system state and the first delta from the third partition.

2. The method of claim 1, further including copying at least some of the content of the first partition into a RAM of the computing device upon invocation of a boot loader.

3. The method of claim 1, further including copying a write engine from the first partition to the computing device to undertake the tracking changes from the initial system state and the writing the first delta and the second delta to the second partition.

4. The method of claim 1, further including determining when step (c) should occur.

* * * * *